US 8,948,122 B2

United States Patent
Kim et al.

(10) Patent No.: US 8,948,122 B2
(45) Date of Patent: Feb. 3, 2015

(54) METHOD OF TRANSMITTING DATA BY UTILIZING RESOURCES IN HYBRID AUTOMATIC REQUEST OPERATIONS

(75) Inventors: Sang Gook Kim, San Diego, CA (US); Young Cheul Yoon, San Diego, CA (US); Li-Hsiang Sun, San Diego, CA (US); Shu Wang, San Diego, CA (US); Suk Woo Lee, San Diego, CA (US); Ho Bin Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 1133 days.

(21) Appl. No.: 11/740,274

(22) Filed: Apr. 25, 2007

(65) Prior Publication Data

US 2007/0286105 A1 Dec. 13, 2007

Related U.S. Application Data

(60) Provisional application No. 60/795,041, filed on Apr. 25, 2006.

(51) Int. Cl.
  H04W 4/00 (2009.01)
  H04L 1/00 (2006.01)
  H04B 7/06 (2006.01)
  H04L 1/06 (2006.01)
  H04L 1/18 (2006.01)

(52) U.S. Cl.
  CPC ............ *H04L 1/0001* (2013.01); *H04B 7/0691* (2013.01); *H04L 1/0618* (2013.01); *H04L 1/1812* (2013.01); *H04L 1/1893* (2013.01); *H04B 7/0669* (2013.01); *H04L 1/0668* (2013.01)
  USPC ........... 370/330; 370/329; 370/229; 455/522; 455/450; 455/101

(58) Field of Classification Search
  CPC .... H04L 1/0001; H04L 1/1812; H04L 1/0618; H04L 1/1893; H04B 7/0691
  See application file for complete search history.

(56) References Cited

U.S. PATENT DOCUMENTS

| | | | |
|---|---|---|---|
| 2002/0122381 A1 | 9/2002 | Wu et al. | |
| 2003/0072285 A1* | 4/2003 | Onggosanusi et al. | 370/335 |
| 2004/0009785 A1* | 1/2004 | Nelson et al. | 455/522 |
| 2004/0082356 A1* | 4/2004 | Walton et al. | 455/522 |
| 2004/0203476 A1 | 10/2004 | Liu | |

(Continued)

FOREIGN PATENT DOCUMENTS

| | | |
|---|---|---|
| CN | 1423869 | 6/2003 |
| CN | 1448015 | 10/2003 |

(Continued)

OTHER PUBLICATIONS

Taiwan Intellectual Property Office Application Serial No. 096114724, Office Action dated May 6, 2013, 6 pages.

(Continued)

*Primary Examiner* — Wayne Cai
(74) *Attorney, Agent, or Firm* — Lee, Hong, Degerman, Kang & Waimey

(57) ABSTRACT

A method of transmitting at least one sub-packet in a wireless communication system is disclosed. More specifically, the method includes transmitting at least one sub-packet based on combination of resources from multiple domains, wherein the combination of resources indicate whether to maintain or change the resource arrangement for subsequent transmission.

4 Claims, 5 Drawing Sheets

(56) References Cited

U.S. PATENT DOCUMENTS

| | | | |
|---|---|---|---|
| 2005/0136844 A1* | 6/2005 | Giesberts et al. | 455/67.13 |
| 2005/0147078 A1* | 7/2005 | Arima et al. | 370/349 |
| 2005/0201280 A1* | 9/2005 | Lundby et al. | 370/229 |
| 2005/0204251 A1* | 9/2005 | Moon et al. | 714/748 |
| 2006/0067421 A1 | 3/2006 | Walton et al. | |
| 2007/0206686 A1* | 9/2007 | Vook et al. | 375/260 |
| 2007/0297360 A1* | 12/2007 | Joachim et al. | 370/329 |

FOREIGN PATENT DOCUMENTS

| | | |
|---|---|---|
| CN | 1910949 | 2/2007 |
| CN | 1938975 | 3/2007 |
| EP | 1585246 | 10/2005 |
| JP | 2004040232 | 2/2004 |
| JP | 2004040314 | 2/2004 |
| JP | 2004064108 | 2/2004 |
| JP | 2005102136 | 4/2005 |
| JP | 2006054617 | 2/2006 |
| JP | 2007529164 | 10/2007 |
| JP | 2008512900 | 4/2008 |
| KR | 10-2002-0072163 A | 9/2002 |
| WO | 01/15486 A1 | 3/2001 |
| WO | 2005008944 | 1/2005 |
| WO | 2005020488 | 3/2005 |
| WO | 2006/006770 A1 | 1/2006 |
| WO | 2006016457 | 2/2006 |
| WO | 2006029050 | 3/2006 |

OTHER PUBLICATIONS

The State Intellectual Property Office of the People's Republic of China Application Serial No. 201210068376.7, Office Action dated Mar. 3, 2014, 7 pages.

* cited by examiner

METHOD OF TRANSMITTING DATA BY UTILIZING RESOURCES IN HYBRID AUTOMATIC REQUEST OPERATIONS

This application claims the benefit of U.S. Provisional Application No. 60/795,041, filed on Apr. 25, 2006, which is hereby incorporated by reference.

BACKGROUND OF THE INVENTION

1. Field of the Invention

The present invention relates to a method of transmitting data, and more particularly, to a method of transmitting data by utilizing resources in hybrid automatic request operations.

2. Discussion of the Related Art

In the world of cellular telecommunications, those skilled in the art often use the terms 1G, 2G, and 3G. The terms refer to the generation of the cellular technology used. 1G refers to the first generation, 2G to the second generation, and 3G to the third generation.

1G refers to the analog phone system, known as an AMPS (Advanced Mobile Phone Service) phone systems. 2G is commonly used to refer to the digital cellular systems that are prevalent throughout the world, and include CDMAOne, Global System for Mobile communications (GSM), and Time Division Multiple Access (TDMA). 2G systems can support a greater number of users in a dense area than can 1G systems.

3G commonly refers to the digital cellular systems currently being deployed. These 3G communication systems are conceptually similar to each other with some significant differences.

In a wireless communication system, it is important to devise schemes and techniques that increase the information rate and improve the robustness of a communication system under the harsh conditions of the wireless environment. To combat less-than-ideal communication conditions and/or to improve communication, various methods, including reducing transmission of unnecessary data, can be used to free up resources as well as promote more effective and efficient transmission.

SUMMARY OF THE INVENTION

Accordingly, the present invention is directed to a method of transmitting data by utilizing resources in hybrid automatic request operations that substantially obviates one or more problems due to limitations and disadvantages of the related art.

An object of the present invention is to provide a method of transmitting at least one sub-packet in a wireless communication system.

Another object of the present invention is to provide a method of using resources in various domains for sub-packet transmission.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting at least one sub-packet in a wireless communication system includes transmitting at least one sub-packet based on combination of resources from multiple domains, wherein the combination of resources indicate whether to maintain or change the resource arrangement for subsequent transmission.

In another aspect of the present invention, a method of using resources in various domains for sub-packet transmission includes combining the resources from the various domains, determining whether each of the various domains indicates adaptation or no adaptation, and transmitting the sub-packets based on combination of the indicated adaptation or no adaptation of each resource.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

A hybrid automatic request (H-ARQ) is a physical layer error control technique providing increased throughput by introducing less interference to the system and compensating inaccuracy presented, for example, in power control. In addition, the increased peak data transmission rate can be achieved by early termination. Encoded packet is divided into multiple sub-packets. Each sub-packet carries incremental redundant information on uncoded packet. H-ARQ can be classified as synchronous and asynchronous ones based on the timing of retransmissions and adaptive and non-adaptive ones based on the change of the parameters, e.g., modulation order, in each transmission.

Figure 5:
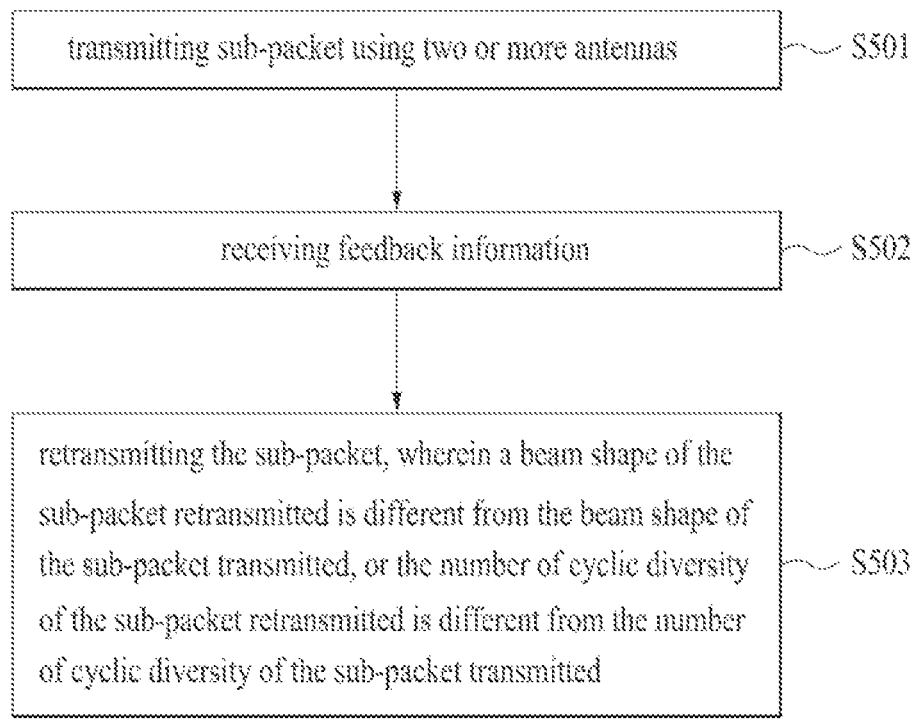

FIG. 5 is a diagram explaining an example of a method of transmitting at least one sub-packet at a transmitting end in a wireless communication system in accordance with one embodiment of the present invention.

In implementing the H-ARQ operations, all of the available resources are not jointly used which in turn limits the system capacity. Hence, discussions are made hereinafter to discuss ways to further increase the system capacity.

The available resources for the H-ARQ operations can be defined in various domains including time, frequency, space, modulation, power, and code domains. These various domain resources can be used for sub-packet transmission.

More specifically, transmission time and duration of each sub-packet can be maintained (synchronous) or changed/varied (asynchronous). If the number of retransmissions exceeds the maximum number of allowable retransmissions, the packet can be retransmitted. For example, the maximum number of retransmissions can be set to six (6) times.

Further, in multi-carrier operation (e.g., orthogonal frequency division multiplexing (OFDM)), the number or set of sub-carriers used for the transmission of each sub-packet can be maintained or changed. Similarly, the number of antenna element involved in the transmission of each sub-packet can be maintained (synchronous) or changed (asynchronous). Moreover, the modulation order used in the transmission of each sub-packet can be maintained or changed.

In addition, the power allocated to the transmission of each sub-packet can be maintained or changed. Lastly, the number of codes for each sub-packet can be maintained or changed.

Regarding changes and maintenance of various resources associated with different domains can be described in more detail with respect to Table 1. As discussed, the same resources can be used or different/varied resources can be used with respective to each domain.

Table 1 illustrates various H-ARQ operations that can be obtained by combining resources in various domains.

| Synchronous or Asynchronous | | | | |
| --- | --- | --- | --- | --- |
| Frequency | Space | Modulation | Power | Code |
| 0 | 0 | 0 | 0 | 0 |
| 0 | 0 | 0 | 0 | 1 |
| 0 | 0 | 0 | 1 | 0 |
| 0 | 0 | 0 | 1 | 1 |
| 0 | 0 | 1 | 0 | 0 |
| 0 | 0 | 1 | 0 | 1 |
| 0 | 0 | 1 | 1 | 0 |
| 0 | 0 | 1 | 1 | 1 |
| 0 | 1 | 0 | 0 | 0 |
| 0 | 1 | 0 | 0 | 1 |
| 0 | 1 | 0 | 1 | 0 |
| 0 | 1 | 0 | 1 | 1 |
| 0 | 1 | 1 | 0 | 0 |
| 0 | 1 | 1 | 0 | 1 |
| 0 | 1 | 1 | 1 | 0 |
| 0 | 1 | 1 | 1 | 1 |
| 1 | 0 | 0 | 0 | 0 |
| 1 | 0 | 0 | 0 | 1 |
| 1 | 0 | 0 | 1 | 0 |
| 1 | 0 | 0 | 1 | 1 |
| 1 | 0 | 1 | 0 | 0 |
| 1 | 0 | 1 | 0 | 1 |
| 1 | 0 | 1 | 1 | 0 |
| 1 | 0 | 1 | 1 | 1 |
| 1 | 1 | 0 | 0 | 0 |
| 1 | 1 | 0 | 0 | 1 |
| 1 | 1 | 0 | 1 | 0 |
| 1 | 1 | 0 | 1 | 1 |
| 1 | 1 | 1 | 0 | 0 |
| 1 | 1 | 1 | 0 | 1 |
| 1 | 1 | 1 | 1 | 0 |
| 1 | 1 | 1 | 1 | 1 |

Referring to Table 1, '0' and '1' mean 'no change' and 'change,' respectively, in the transmission of sub-packets. Here, 'no change' means that the same resources are used for each sub-packet transmission where as 'change' means that different resources are used. More specifically, 'change' also means that the resources can be increased or decreased. Furthermore, change and no change can also be referred to as adaptation or variation and no adaptation or no variation.

Moreover, 'change' in various domains can be with respective to time (e.g., synchronous or asynchronous), frequency in which the number of subcarriers in the transmission of subsequent sub-packets can be increased or decreased), space in which the number of antenna elements involved in the transmission of subsequent sub-packets can be increased or decreased, modulation in which the modulation order used in the transmission of subsequent sub-packets can be increased or decreased, power in which the power allocated to the transmission of subsequent sub-packets can be increased or decreased; and code in which the number of codes assigned to the transmission of each sub-packet can be increased or decreased.

With respect to the frequency domain, '0' denotes that the same frequency resource may be used for all sub-packet transmissions. Alternatively, '1' means that frequency resource used in each or subset of sub-packet transmission(s) may be different. That is, it can be increased or decreased. For example, in OFDM transmission, the first sub-packet may be transmitted using 50 sub-carriers and the second to the last sub-packet may be transmitted using 25 (decreased) sub-carriers or 75 (increased) sub-carriers.

With respect to the space domain, '0' means that the same space resource may be used for all sub-packet transmissions. Alternatively, '1' means that space resource used in each or subset of sub-packet transmission (s) may be different. That is, it can be increased or decreased. For example, in antenna selection case, the first sub-packet may be transmitted using the antenna(s) selected from four (4) antennas and the second to the last sub-packet may be transmitted using an antenna selected from 2 antennas.

Further, consider the case where each or subset of sub-packet(s) is transmitted using different set of antennas selected from the same set of antennas. This example can be applicable to beamforming and cyclic delay diversity cases. Each or subset of sub-packet(s) may be transmitted using different beam shape. First sub-packet may be transmitted using narrow beam (beneficial if the $1^{st}$ sub-packet carries systematic bits in Turbo Code) and the second to the last sub-packet may be transmitted using wider beam.

In addition, each or subset of sub-packet(s) may be transmitted using different number of cyclic diversity. First sub-packet may be transmitted using three (3) antenna cyclic diversity and the second to the last sub-packet may be transmitted using two (2) antenna cyclic diversity.

Figure 1:
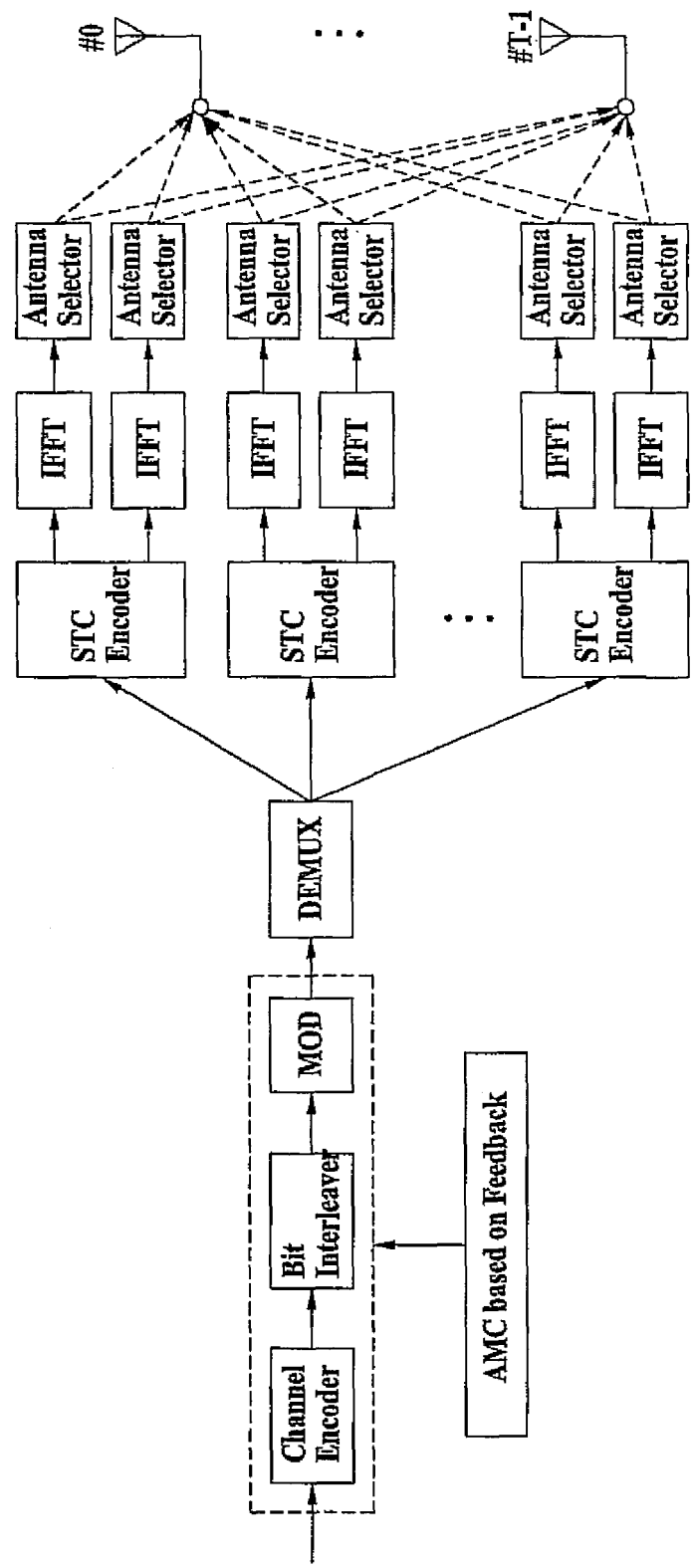
FIG. 1 is an exemplary diagram illustrating transmit diversity combined with antenna selection.

FIG. 1 is an exemplary diagram illustrating transmit diversity combined with antenna selection. Referring to FIG. 1, data stream is encoded based on feedback information provided from the receiving side. More specifically, based on the feedback information, the data is processed using an adaptive modulation and coding (AMC) scheme at the transmitting end. The data processed according to the AMC scheme is channel coded, interleaved, and then modulated into symbols (which can also be referred to as coded or modulated data stream).

The symbols are then demultiplexed to multiple STC encoder blocks. Here, demultiplexing is based on the code rate and modulation that the carrier can support. Each STC encoder block encodes the symbols and outputs to encoded symbols to inverse fast Fourier transform (IFFT) block(s). The IFFT block transforms the encoded symbols. The transformed symbols are then assigned to antennas selected by antenna selector(s) for transmission to the receiving end. The selection as to which antenna to be used for transmission can be based on the feedback information.

Figure 2:
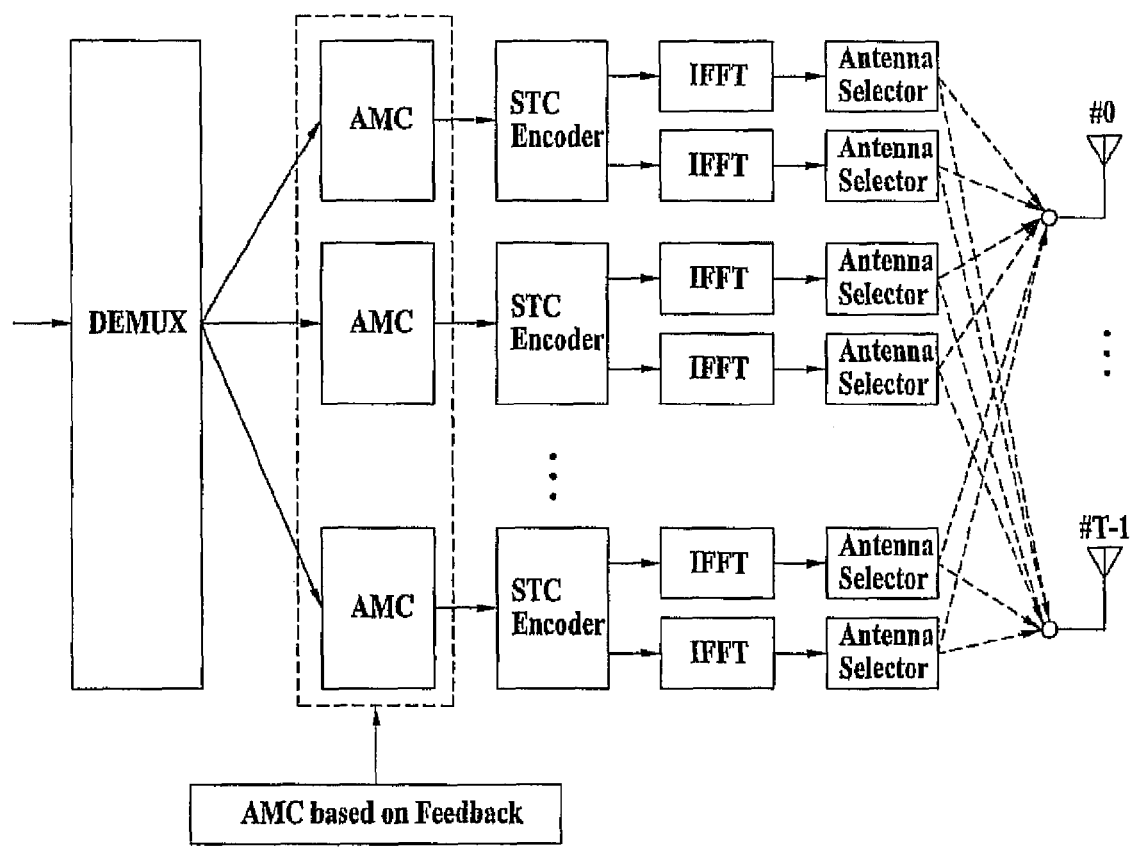
FIG. 2 is another exemplary diagram illustrating transmit diversity combined with antenna selection.

FIG. 2 is another exemplary diagram illustrating transmit diversity combined with antenna selection. Different from FIG. 1 which is designed for a single codeword (SWC) operation, in FIG. 2, adaptive modulation and coding is performed per carrier basis and is designed for a multiple codeword (MWC) operation.

According to FIGS. 1 and 2, the data is processed by the STC encoders before being processed by the IFFT block(s). However, it is possible for the data to be processed by the IFFT block before being processed by the STC encoder blocks. In short, the processing order between the STC encoders and the IFFT blocks can be switched.

In detail, the feedback information from the receiving end can be used in performing channel coding and modulation (or in executing the AMC scheme) to the data stream. This AMC scheme process is illustrated in a dotted box. The feedback information used in channel coding and modulation can be a data rate control (DRC) or a channel quality indicator (CQI), for example. Further, the feedback information can include various information such as sector identification, carrier/frequency index, antenna index, supportable CQI value, best antenna combination, selected antennas, and a supportable signal-to-interference noise ratio (SINR) for a given assigned multi-carriers.

The information related to selected antennas as well as its supportable SINR can be transmitted through a channel from the receiving end to the transmitting end (e.g., reverse link) or on a different channel. Such a channel can be a physical channel or a logical channel. Further, the information related to the selected antennas can be transmitted in a form of a bitmap. The position of each bitmap represents the antenna index.

The DRC or the CQI, for example, can be measured per transmit antenna. As an example of the CQI, a transmitting end can send signal (e.g., pilot) to a receiving end to determine the quality of the channel(s) through which the signal was sent. Each antenna transmits its own pilot for the receiving end to extract the channel information from the antenna element to the receiving end. The transmitting end can also be referred to as an access node, base station, network, or Node B. Moreover, the receiving end can also be referred to as an access terminal, mobile terminal, mobile station, or mobile terminal station. In response to the signal from the transmitting end, the receiving end can send to the transmitting end the CQI to provide the channel status or channel condition of the channel through which the signal was sent.

Furthermore, the feedback information (e.g., DRC or CQI) can be measured using a pre-detection scheme or a post-detection scheme. The pre-detection scheme includes inserting antenna-specific known pilot sequence before an orthogonal frequency division multiplexing (OFDM) block using a time division multiplexing (TDM). The post-detection scheme involves using antenna-specific known pilot pattern in OFDM transmission.

Further, the feedback information is based on each bandwidth or put differently, the feedback information includes the channel status information on each of N number of 1.25 MHz, 5 MHz, or a sub-band of OFDM bandwidth.

As discussed, the symbols processed using the AMC scheme are demultiplexed to multiple STC encoder blocks. The STC encoder blocks can implement various types of coding techniques. For example, the encoder block can be a STC encoder. Each STC encoder can have a basic unit of MHz. In fact, in FIG. 1, the STC encoder covers 1.25 MHz. Other types of coding techniques include space-time block code (STBC), non-orthogonal STBC (NO-STBC), space-time Trellis coding (STTC), space-frequency block code (SFBC), space-time frequency block code (STFBC), cyclic shift diversity, cyclic delay diversity (CDD), Alamouti, and precoding.

As discussed, the IFFT transformed symbols are assigned to specific antenna(s) by the antenna selectors based on the feedback information. That is, in FIG. 1, the antenna selector chooses the pair of antenna corresponding to two outputs from the STC encoder specified in the feedback information.

The antenna selectors select the antennas for transmitting specific symbols. At the same time, the antenna selector can choose the carrier (or frequency bandwidth) through which the symbols are transmitted. The antenna selection as well as frequency selection is based on the feedback information which is provided per each bandwidth of operation. Furthermore, the wireless system in which antenna and frequency allocation is made can be a multi input, multi output (MIMO) system.

Figure 3:
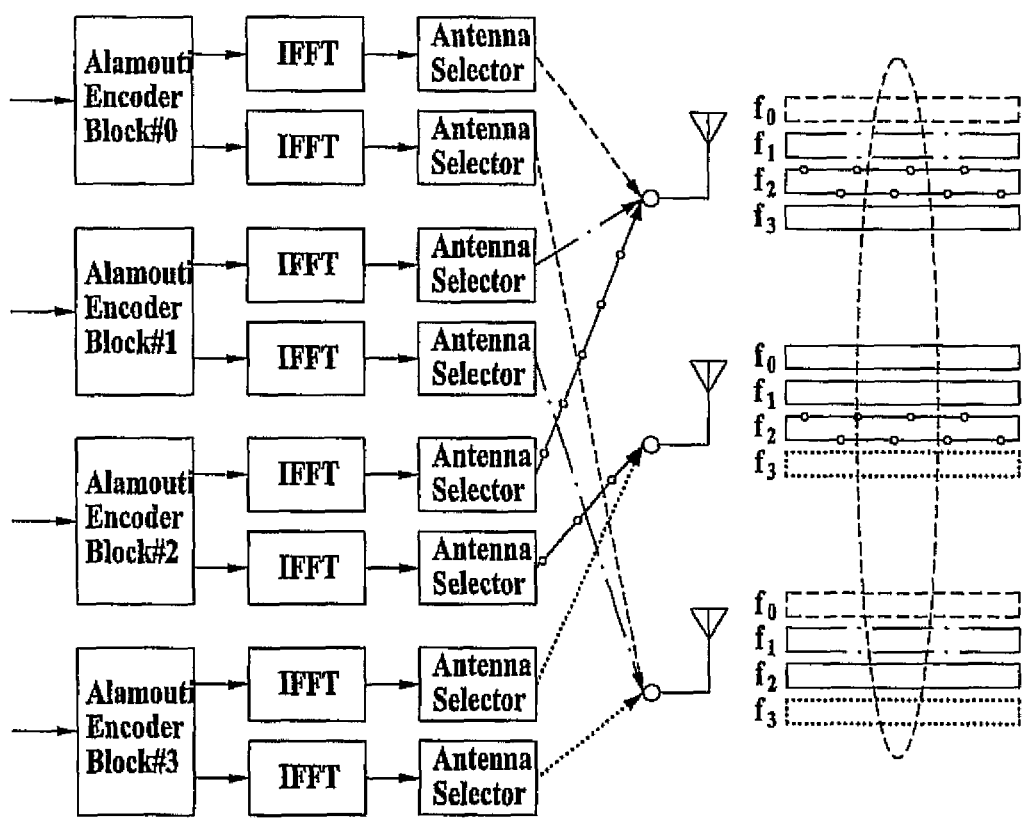
FIG. 3 is an exemplary diagram illustrating antenna selection and frequency allocation.

FIG. 3 is an exemplary diagram illustrating antenna selection and frequency allocation. Referring to FIG. 3, there are four (4) frequency bandwidths or carriers and three (3) antennas. Here, the symbols processed through Alamouti encoder Block #0 are assigned to antennas by the antenna selectors. The symbols from Block #0 are assigned to a first antenna on frequency 0 ($f_0$) from a first of two antenna selectors. At the same time, the other symbols of Block #0 are assigned to a third antenna on frequency on frequency 0 ($f_0$) from the other antenna selector. Moreover, the symbols from Block #3 are assigned to a second antenna on frequency 3 ($f_3$) from a first of two antenna selectors. At the same time, the other symbols of Block #3 are assigned to a third antenna on frequency on frequency 3 ($f_3$) from the other antenna selector. With respect to frequency allocation, frequency allocation is maintained for at least two consecutive OFDM symbol intervals.

Figure 4:
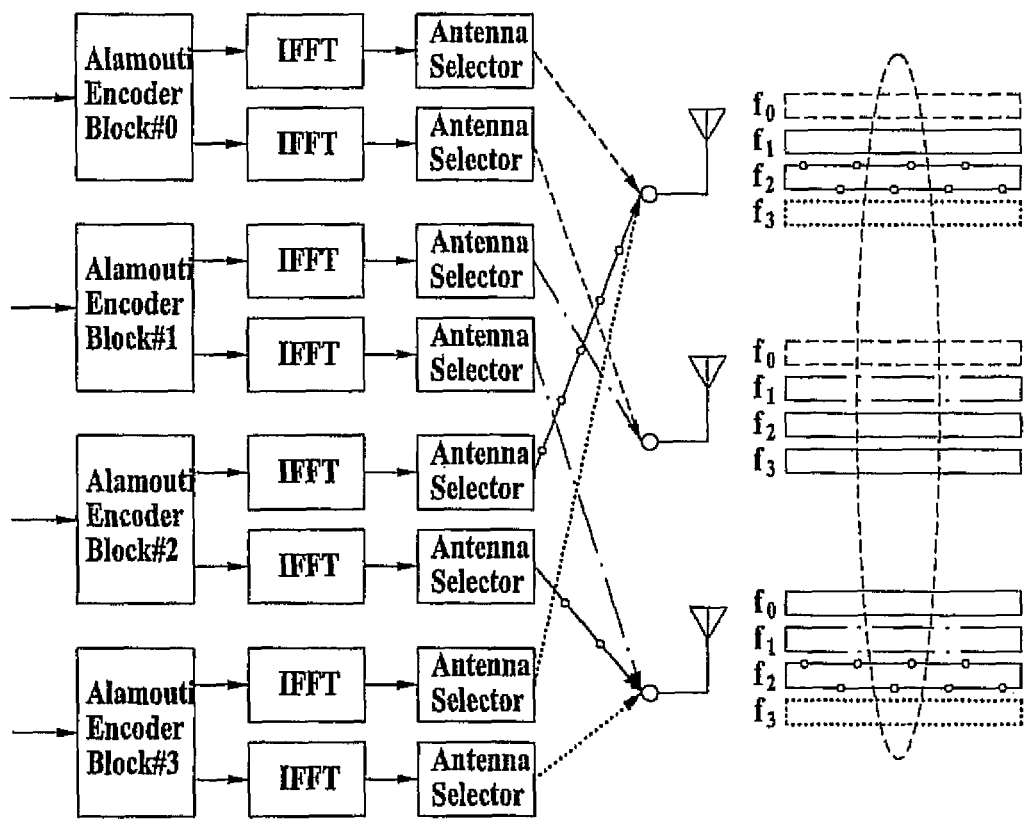
FIG. 4 is another exemplary diagram illustrating antenna selection and frequency allocation.

Similarly, FIG. 4 is another exemplary diagram illustrating antenna selection and frequency allocation. In FIGS. 3 and 4, the data symbols from each block are assigned to different antennas so as to achieve diversity gain.

In general case, each or subset of sub-packet(s) transmission may utilize different antenna technologies. For example, first sub-packet may be transmitted using beamforming and second to the last sub-packet may be transmitted using space time transmit diversity (STTD), antenna selection, or single input single output (SISO), among others.

The order of using antenna technologies is arbitrary. For example, antenna selection from increasing number of antenna elements as the sub-packet transmission increases may be used. First sub-packet may be transmitted using an antenna selected from two (2) antennas, and second to the last sub-packet may be transmitted using the antenna(s) selected from four (4) antennas.

With respect to the modulation domain, '0 means that the same modulation scheme is used for all sub-packet transmissions. Alternatively, '1' means that the modulation scheme used in each or subset of sub-packet transmission(s) may be different. That is, modulation order can be increased or decreased. For example, in modulation step-down, first sub-packet is transmitted using 16 quadrature amplitude modulation (16-QAM) scheme and the second to the last sub-packet is transmitted using 8 phase shift keying (PSK), quadrature PSK (QPSK), or binary PSK (BPSK), among others. In modulation step-up, lower order modulation may be used in the $1^{st}$ sub-packet transmission and higher order modulation may be used in subsequent sub-packet transmissions.

With respect to the power domain, '0' means that the same power may be used for all sub-packet transmissions. Alternatively, '1' means that the power used in each or subset of sub-packet transmission(s) is different. That is, it may be increased or decreased. For example, in energy (or power) reduction, first sub-packet may be transmitted using higher energy (or power) and the second to the last sub-packet is transmitted using lower energy (or power). In energy (or power) increase, lower power may be used in the first sub-packet transmission and higher power may be used in subsequent sub-packet transmissions.

With respect to the code domain, '0' means that the same number and code (spreading) may be used for all sub-packet transmissions. Alternatively, '1' means that the number and code used in each or subset of sub-packet transmission(s) may be different. That is, it may be increased or decreased.

For example, first sub-packet may be transmitted using larger number of codes and the second to the last sub-packet is transmitted using less number of spreading codes. Here, the number of codes assigned to the transmission of each sub-packet can be one (1) bit for the first transmission, then increased to 10 bits for the second transmission, and then decreased to two (2) bits for the third transmission, and so on. This illustrates how the number of codes used in the transmission can be increased and/or decreased.

In reverse case, less number of codes may be used in the first sub-packet transmission and larger number of codes may be used in subsequent sub-packet transmissions. This can be applicable to code division multiple access (CDMA) and multi-carrier CDMA (MC-CDMA).

Referring to Table 1, by way of an example, row #2 (whose domains are all indicated by '0's except for code domain indicated by '1') would increase or decrease the number of codes used in transmission of each subset or sub-packet. Moreover, the last row indicates that all the domains would need to increase or decrease. In a similar manner, each row can be interpreted.

The resource allocation in H-ARQ can be maintained or changed throughout the retransmission (e.g., resources in various domains can be adaptively allocated throughout H-ARQ operation). Channel quality feedback from the receiver can be used to select the resource allocation adaptively. Selection of the resources per transmission can be informed to the receiver using control or overhead channel.

The discussion of above can be used in systems such as an ultra mobile broadband (B) system.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

FIG. 5 is a diagram explaining an example of a method of transmitting at least one sub-packet at a transmitting end in a wireless communication system in accordance with one embodiment of the present invention. Referring to FIG. 5, the transmitting end transmits at least one sub-packet to a receiving end by using a combination of resources from multiple domains (S501). The transmitting end receives feedback information from the receiving end (S502). And then, the transmitting end retransmits the at least one sub-packet to the receiving end, wherein the combination of resources for retransmitting the at least one sub-packet maintain or change according to feedback information received from the receiving end (S503).

What is claimed is:
1. A method of transmitting a signal from a transmitting end in a wireless communication system, the method comprising:
    performing a transmission to a receiving end by using resources from multiple domains;
    receiving feedback information from the receiving end; and
    performing a subsequent transmission by using the resources from the multiple domains according to a combination of the resources based on the feedback information,
    wherein the transmission and the subsequent transmission are performed via at least two transmitting antennas,
    wherein the feedback information includes bitmap information associated with indexes of one or more transmitting antennas selected from the at least two transmitting antennas by the receiving end,
    wherein a cyclic diversity number for the subsequent transmission is different from a cyclic diversity number for the transmission, the cyclic diversity number for the subsequent transmission determined based on the bitmap information.
2. The method of claim 1, wherein the multiple domains include a time, frequency, space, modulation, power, or code.
3. The method of claim 1, wherein a beam shape for the subsequent transmission is not the same as a beam shape for the transmission.
4. The method of claim 1, wherein the transmission and the subsequent transmission are performed using 16 quadrature amplitude modulation (16-QAM), 8 phase shift keying (PSK), quadrature PSK (QPSK), or binary PSK (3 PSK).

* * * * *